United States Patent
Belnap et al.

(10) Patent No.: US 9,422,770 B2
(45) Date of Patent: Aug. 23, 2016

(54) METHOD FOR BRAZE JOINING OF CARBONATE PCD

(71) Applicant: SMITH INTERNATIONAL, INC., Houston, TX (US)

(72) Inventors: J. Daniel Belnap, Lindon, UT (US); Yahua Bao, Orem, UT (US); Youhe Zhang, Spring, TX (US); Liang Zhao, Houston, TX (US); Zhijun Lin, The Woodlands, TX (US)

(73) Assignee: Smith International, Inc., Houston, TX (US)

( * ) Notice: Subject to any disclaimer, the term of this patent is extended or adjusted under 35 U.S.C. 154(b) by 128 days.

(21) Appl. No.: 13/728,655

(22) Filed: Dec. 27, 2012

(65) Prior Publication Data
US 2013/0168158 A1    Jul. 4, 2013

Related U.S. Application Data

(60) Provisional application No. 61/581,839, filed on Dec. 30, 2011.

(51) Int. Cl.
| | |
|---|---|
| *E21B 10/46* | (2006.01) |
| *B01J 3/06* | (2006.01) |
| *B23K 31/02* | (2006.01) |
| *E21B 10/567* | (2006.01) |
| *B23K 1/00* | (2006.01) |
| *B23K 1/008* | (2006.01) |
| *B23K 1/19* | (2006.01) |

(52) U.S. Cl.
CPC ............... *E21B 10/46* (2013.01); *B23K 1/0008* (2013.01); *B23K 1/008* (2013.01); *B23K 1/19* (2013.01); *B23K 31/025* (2013.01); *E21B 10/567* (2013.01)

(58) Field of Classification Search
CPC ............... B01J 3/06; B26D 3/00; C09K 3/14; B32B 37/04; E21B 10/46
See application file for complete search history.

(56) References Cited

U.S. PATENT DOCUMENTS

| | | | |
|---|---|---|---|
| 4,225,322 A | 9/1980 | Knemeyer | |
| 4,319,707 A | 3/1982 | Knemeyer | |
| 4,772,294 A | 9/1988 | Schroeder | |
| 5,032,147 A | 7/1991 | Frushour | |
| 5,624,756 A | 4/1997 | Ueda et al. | |
| 5,628,945 A * | 5/1997 | Riman et al. | 264/117 |
| 6,045,768 A | 4/2000 | Bergmann | |

(Continued)

FOREIGN PATENT DOCUMENTS

WO    2012025613 A2    3/2012

OTHER PUBLICATIONS

Qian et al., "Polycrystalline diamond cutters sintered with magnesium carbonate in cubic anvil press," Int. Journal of Refractory Metals and Hard Materials, 2012, vol. 31: pp. 71-75.

*Primary Examiner* — Pegah Parvini

(57) ABSTRACT

A method for making a diamond compact includes pre-heating a diamond body which includes a carbonate catalyst to convert at least a portion of the carbonate catalyst into an oxide, assembling the diamond body and a substrate, providing a braze material between the diamond body and the substrate to form a diamond compact, heating the braze material to melt the braze material and form a braze joint between the diamond body and the substrate, and cooling the braze material after increasing the pressure. A bit having a diamond compact including a carbonate catalyst and a metal oxide mounted thereon.

20 Claims, 4 Drawing Sheets

(56) References Cited

U.S. PATENT DOCUMENTS

| | | | |
|---|---|---|---|
| 6,155,755 A * | 12/2000 | Kanada et al. | 407/118 |
| 6,248,447 B1 | 6/2001 | Griffin et al. | |
| 6,776,329 B2 | 8/2004 | Schwarzbauer | |
| 7,261,753 B2 | 8/2007 | Yamamoto et al. | |
| 7,621,974 B2 | 11/2009 | Yamamoto et al. | |
| 7,628,234 B2 | 12/2009 | Middlemiss | |
| 7,635,035 B1 | 12/2009 | Bertagnolli et al. | |
| 7,950,477 B1 | 5/2011 | Bertagnolli et al. | |
| 8,028,771 B2 | 10/2011 | Keshavan et al. | |
| 8,043,533 B2 | 10/2011 | Tajima et al. | |
| 8,057,562 B2 | 11/2011 | Middlemiss | |
| 8,061,454 B2 | 11/2011 | Voronin et al. | |
| 8,061,458 B1 | 11/2011 | Bertagnolli et al. | |
| 8,147,573 B2 | 4/2012 | Yamamoto et al. | |
| 2004/0094333 A1 | 5/2004 | Yamamoto et al. | |
| 2007/0023206 A1* | 2/2007 | Keshavan et al. | 175/374 |
| 2007/0187154 A1 | 8/2007 | Yamamoto et al. | |
| 2007/0187155 A1 | 8/2007 | Middlemiss | |
| 2008/0085407 A1* | 4/2008 | Cooley et al. | 428/336 |
| 2009/0032169 A1* | 2/2009 | Dourfaye et al. | 156/90 |
| 2009/0078470 A1 | 3/2009 | Lyons et al. | |
| 2009/0173547 A1 | 7/2009 | Voronin et al. | |
| 2009/0260895 A1* | 10/2009 | Vail | E21B 10/46 175/434 |
| 2010/0019017 A1 | 1/2010 | Yamamoto et al. | |
| 2010/0084194 A1 | 4/2010 | Middlemiss | |
| 2010/0084197 A1 | 4/2010 | Voronin et al. | |
| 2010/0212971 A1* | 8/2010 | Mukhopadhyay et al. | 175/428 |
| 2010/0243335 A1 | 9/2010 | Dourfaye et al. | |
| 2010/0243336 A1 | 9/2010 | Dourfaye et al. | |
| 2010/0243337 A1 | 9/2010 | Scott | |
| 2010/0275523 A1 | 11/2010 | Tank | |
| 2011/0023375 A1 | 2/2011 | Sani et al. | |
| 2011/0036643 A1 | 2/2011 | Belnap et al. | |
| 2011/0061942 A1 | 3/2011 | Digiovanni | |
| 2011/0061944 A1 | 3/2011 | Scott et al. | |
| 2011/0067929 A1 | 3/2011 | Mukhopadhyay et al. | |
| 2011/0083908 A1 | 4/2011 | Shen et al. | |
| 2011/0083909 A1 | 4/2011 | Shen et al. | |
| 2011/0120782 A1* | 5/2011 | Cooley | B24D 99/005 175/432 |
| 2011/0241266 A1 | 10/2011 | Wardoyo et al. | |
| 2011/0252711 A1 | 10/2011 | Chakraborty et al. | |
| 2011/0252712 A1 | 10/2011 | Chakraborty et al. | |
| 2011/0252713 A1 | 10/2011 | Chakraborty et al. | |
| 2012/0102843 A1 | 5/2012 | Chakraborty et al. | |
| 2012/0241224 A1 | 9/2012 | Qian et al. | |

* cited by examiner

METHOD FOR BRAZE JOINING OF CARBONATE PCD

CROSS-REFERENCE TO RELATED APPLICATION

This application claims the benefit of U.S. Provisional Patent Application Ser. No. 61/581,839 filed on Dec. 30, 2011, which is incorporated herein by reference in its entirety.

BACKGROUND

The present invention relates to ultra-hard materials, and more particularly, to a method for braze joining an ultra-hard element to a substrate support. Ultra-hard materials are often used in cutting tools and rock drilling tools. Polycrystalline diamond material is one such ultra-hard material, and is known for its good wear resistance and hardness. To form polycrystalline diamond, diamond particles are sintered at high pressure and high temperature (HPHT sintering) to produce an ultra-hard polycrystalline structure. A catalyst material is added to the diamond particle mixture prior to sintering and/or infiltrates the diamond particle mixture during sintering in order to promote the intergrowth of the diamond crystals during HPHT sintering, to form the polycrystalline diamond (PCD) structure. Metals conventionally employed as the catalyst are selected from the group of solvent metal catalysts selected from Group VIII of the Periodic table, including cobalt, iron, and nickel, and combinations and alloys thereof. After HPHT sintering, the resulting PCD structure includes a network of interconnected diamond crystals or grains bonded to each other, with the catalyst material occupying the interstitial spaces or pores between the bonded diamond crystals. The diamond particle mixture may be HPHT sintered in the presence of a substrate, to form a PCD compact bonded to the substrate. The substrate may also act as a source of the metal catalyst that infiltrates into the diamond particle mixture during sintering.

The amount of catalyst material used to form the PCD body represents a compromise between desired properties of strength, toughness and impact resistance versus hardness, wear resistance, and thermal stability. While a higher metal catalyst content generally increases the strength, toughness, and impact resistance of the resulting PCD body, this higher metal catalyst content also decreases the hardness and wear resistance as well as the thermal stability of the PCD body. This trade-off makes it difficult to provide PCD having desired levels of hardness, wear resistance, thermal stability, strength, impact resistance, and toughness to meet the service demands of particular applications, such as in cutting and/or wear elements used in subterranean drilling devices.

Thermal stability can be particularly relevant during wear or cutting operations. Conventional PCD bodies may be vulnerable to thermal degradation when exposed to elevated temperatures during cutting and/or wear applications. This vulnerability results from the differential that exists between the thermal expansion characteristics of the metal catalyst disposed interstitially within the PCD body and the thermal expansion characteristics of the intercrystalline bonded diamond. This differential thermal expansion is known to start at temperatures as low as 400° C., and can induce thermal stresses that are detrimental to the intercrystalline bonding of diamond and that eventually result in the formation of cracks that can make the PCD structure vulnerable to failure. Accordingly, such behavior is not desirable.

Another form of thermal degradation known to exist with conventional PCD materials is one that is also related to the presence of the metal catalyst in the interstitial regions of the PCD body and the adherence of the metal catalyst to the diamond crystals. Specifically, the metal catalyst is known to cause an undesired catalyzed phase transformation in diamond (converting it to carbon monoxide, carbon dioxide or graphite) with increasing temperature, thereby limiting the temperatures at which the PCD body may be used.

To improve the thermal stability of the PCD material, a carbonate catalyst has been used to form the PCD. The carbonate catalyst is mixed with the diamond powder prior to sintering, and promotes the growth of diamond grains during sintering. When a carbonate catalyst is used, the diamond remains stable in polycrystalline diamond form with increasing temperature, rather than being converted to carbon dioxide, carbon monoxide or graphite. Thus the carbonate PCD is more thermally stable than PCD formed with a metal catalyst.

However, the carbonate catalyst itself is subject to a decomposition reaction with increasing temperature, converting to a metal oxide. The carbonate may be released as $CO_2$ gas, causing outgassing of the carbonate PCD material. This outgassing can cause undesirable voids, bubbles or films on adjacent surfaces, leading to imperfections in the ultra-hard material. Accordingly, there is still a need for a carbonate PCD body with a more stable catalyst phase and reduced outgassing.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present invention relates to ultra-hard materials, and more particularly, to a method for braze joining an ultra-hard element to a substrate support. In one embodiment, a method for forming a braze joint for a carbonate PCD construction is provided. The method includes pre-heating a diamond body comprising a carbonate catalyst to convert at least a portion of the carbonate catalyst into an oxide, and assembling the diamond body and a substrate. The method includes providing a braze material between the diamond body and the substrate, and heating the braze material to melt the braze material and form a braze joint between the diamond body and the substrate. The method includes increasing a pressure on the braze material after melting the braze material, and cooling the braze material after increasing the pressure. In one embodiment, the diamond body includes a magnesium carbonate catalyst and magnesium oxide, and pre-heating includes pre-heating the diamond body to a temperature not greater than 650° C. In another embodiment, the diamond body includes a magnesium carbonate catalyst and magnesium oxide, and pre-heating includes surrounding the diamond body with carbide powder and heating the diamond body which is surrounded by the carbide to a temperature not greater than 650° C. In another embodiment, a cutting element is provided including the substrate support and the carbonate PCD mounted thereon. In another embodiment, a drill bit is provided having a body and a cutting element including a carbonate PCD mounted on such bit body.

DETAILED DESCRIPTION

The present invention relates to ultra-hard materials, and more particularly, to a method for braze joining an ultra-hard element to a substrate support. For clarity, as used herein, the term "PCD" refers to conventional polycrystalline diamond that has been formed with the use of a metal catalyst during an HPHT sintering process, forming a microstructure of bonded diamond crystals with the catalyst material occupying the interstitial spaces or pores between the bonded diamond crystals. The term "carbonate PCD" refers to PCD formed with a carbonate catalyst, forming a microstructure of bonded diamond crystals with the carbonate catalyst material occupying the interstitial spaces or pores between the bonded diamond crystals.

Figure 6:
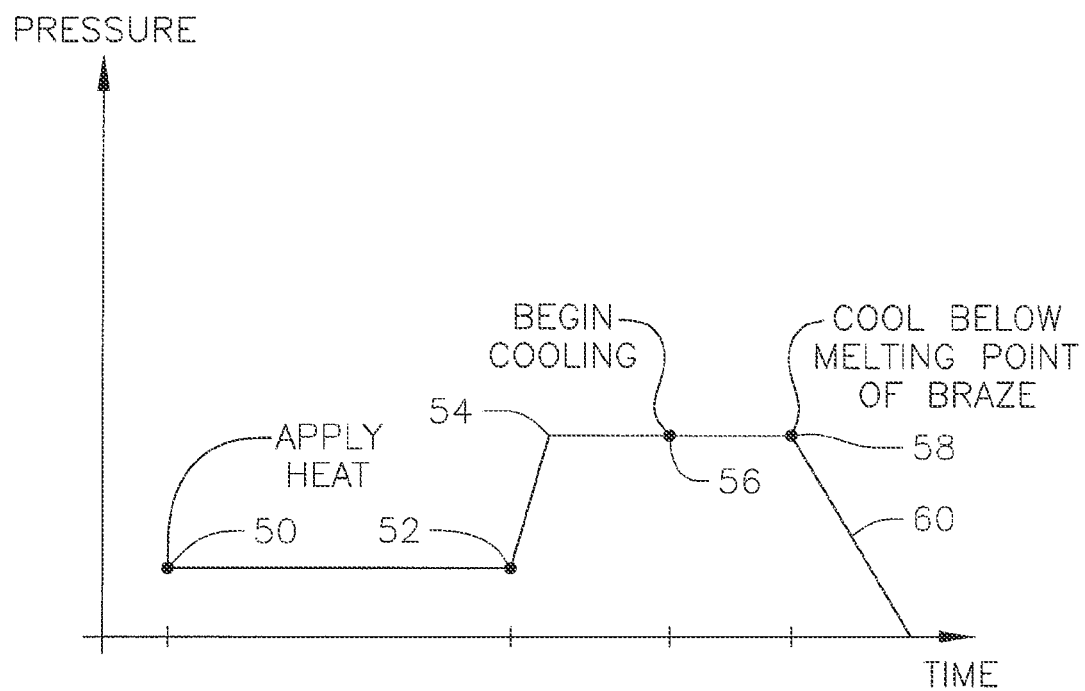
FIG. 6 is a graph of a pressure profile over time, according to an embodiment.

In one embodiment, a method for forming a braze joint for a carbonate PCD construction is provided. In this method, a carbonate PCD body is provided, having been previously formed by an HPHT sintering process in the presence of a carbonate catalyst. If a substrate was used during the HPHT process, it is subsequently removed from the carbonate PCD body. The carbonate PCD body is pre-heated, prior to brazing the carbonate PCD body to a substrate, in order to promote the formation of oxides and the out-gassing of the carbonate catalyst. Pre-heating drives off a portion of the gas from the carbonate catalyst in an isolated environment, where the out-gassing does not affect other components of the final diamond compact. Subsequently, the carbonate PCD body is combined with a braze layer and a substrate to form a diamond compact. The diamond compact is heated to melt the braze, in order to form a braze joint. During this heating, remaining portions of carbonate catalyst within the PCD may further outgas, forming bubbles in the melted braze. After the braze has melted, an increased pressures is applied to the diamond compact to pop and reduce or otherwise remove any bubbles formed in the heated, melted braze. Thus, the pressure profile during the braze operation is variable, with an increased pressure applied after melting the braze. The increased pressure is maintained while the braze is cooled past its melting point, forming a solid braze joint with a reduced presence of bubbles. An embodiment of the active pressure profile is shown in FIG. 6. As shown in FIG. 6, the diamond compact is heated (50) to melt the braze. After the braze has melted (52), the pressure is increased (54). While maintaining the increase pressure cooling is begun (56). Once the braze has cooled to a temperature below is melting point (58), the pressure is reduced (60).

Figure 1:
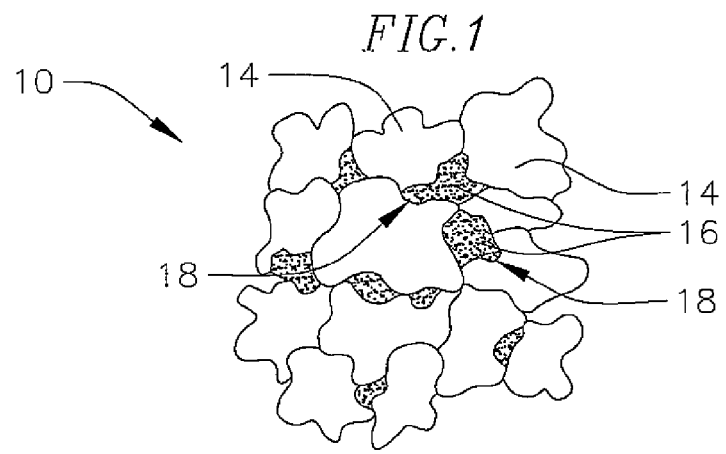
FIG. 1 illustrates a schematic view of a material microstructure of a carbonate polycrystalline diamond material according to an embodiment (with dimensions exaggerated and not to scale, for clarity).

A region of a carbonate PCD material 10 is schematically illustrated in FIG. 1. The carbonate PCD material 10 has a polycrystalline microstructure including multiple diamond grains or crystals 14 bonded to each other, with interstitial spaces or pores 18 between the diamond crystals. This polycrystalline microstructure is formed by subjecting a diamond powder to an HPHT sintering process in the presence of a carbonate catalyst. In one embodiment, the HPHT sintering process includes applying a pressure of about 65 kbar or greater, and a temperature of greater than 1800° C. At this temperature and pressure, the carbonate catalyst material melts and infiltrates into the diamond powder mixture. The catalyst promotes the growth of diamond crystals during the HPHT sintering process, forming carbonate PCD. The result is a carbonate PCD material with the carbonate catalyst material 16 occupying the interstitial spaces 18 between the diamond crystals 14. In one embodiment, the diamond grains 14 in the carbonate PCD material are about 1-20 microns in size.

Figure 2:
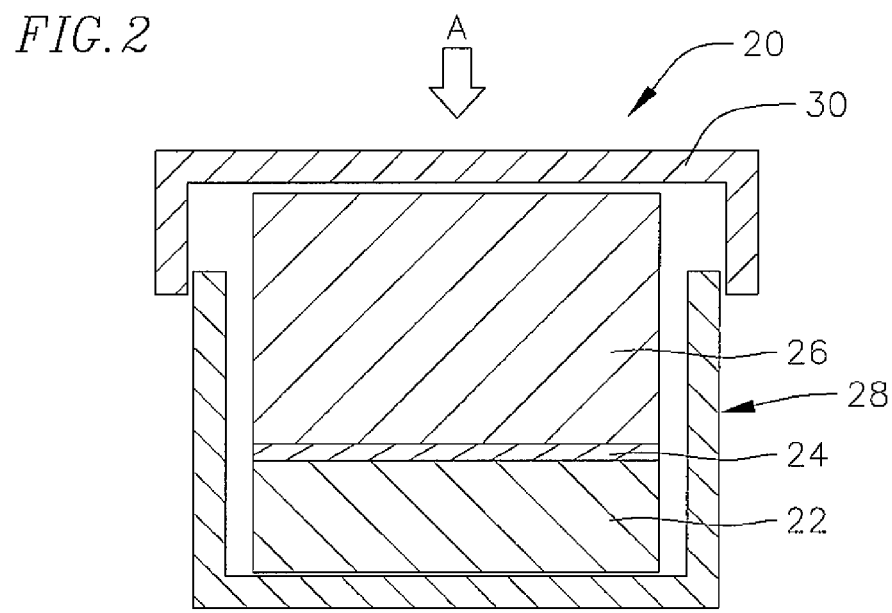
FIG. 2 illustrates a cross-sectional view of an assembly for forming a braze joint between a carbonate polycrystalline material and a substrate.

After formation of this carbonate PCD body, it may be desired to attach the carbonate PCD body to a substrate, in order to form a cutting element that can be attached to a cutting tool. The carbonate PCD body may be attached to a substrate by brazing. An assembly for brazing a carbonate PCD body to a substrate is shown in FIG. 2. The braze assembly 20 includes a carbonate PCD body 22, a braze layer 24, and a substrate 26. These components are stacked together, with the braze layer 24 positioned between the carbonate PCD body 22 and the substrate 26. In one embodiment, the carbonate PCD body 22 is positioned at the bottom of the stack. The braze material 24 may have a thickness of about 3-4 mils. Optionally, the stacked components are placed inside a can 28. The can 28 contains the stacked components and prevents them from sliding away from each other. The can also protects the carbonate PCD, braze, and substrate from the surrounding environment and safely contains the braze process. The can 28 may also have a lid 30 which fits over the top ends of the can. The can and lid are formed from a refractory metal such as niobium, molybdenum or tantalum.

In one embodiment, the substrate 26 is a tungsten carbide cobalt substrate, which is used to attach the carbonate PCD body to a cutting tool such as a drag bit.

Figure 4:
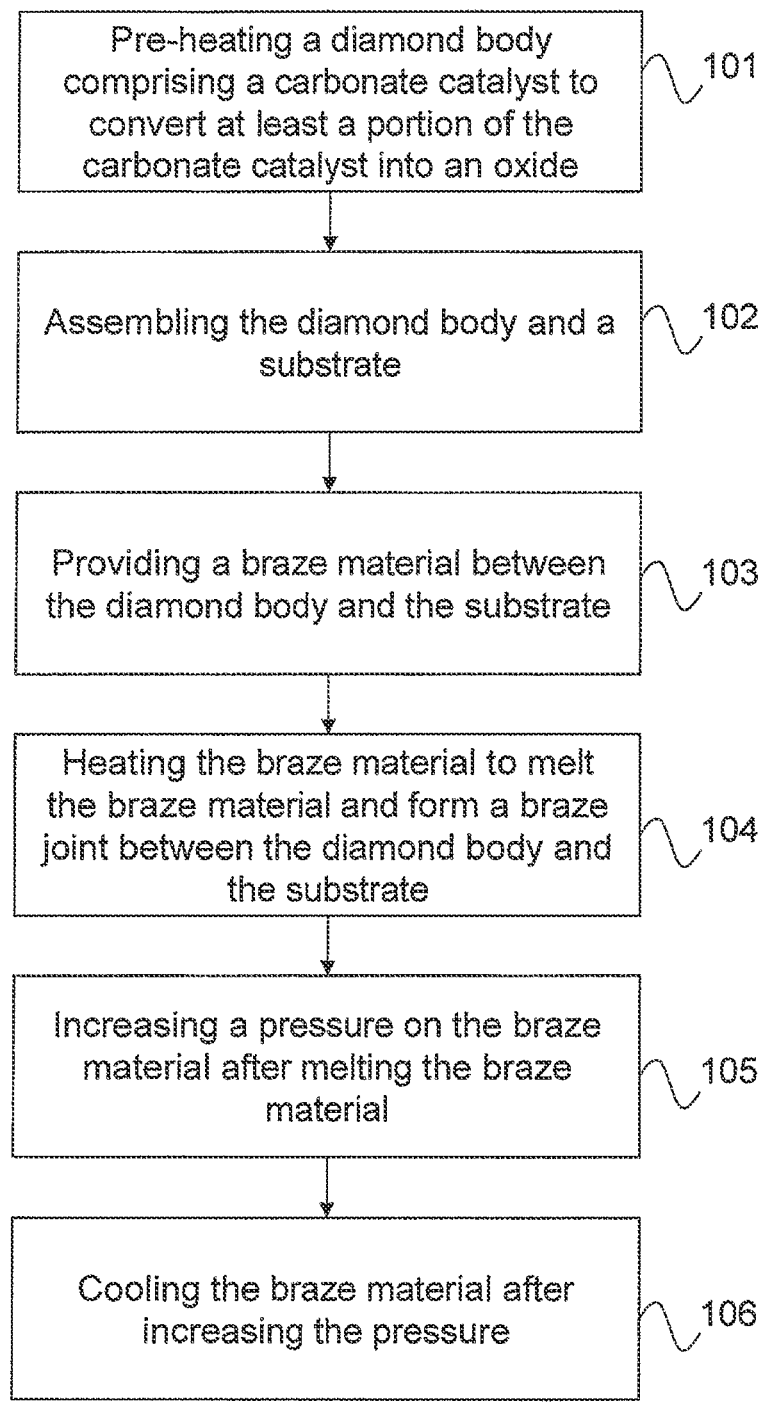
FIG. 4 is a flowchart illustrating a method of forming a braze joint in a diamond compact, according to an embodiment.

A method for forming a braze joint is shown in FIG. 4, according to an embodiment. The method includes pre-heating the carbonate diamond body, which includes a carbonate catalyst, to convert at least a portion of the carbonate catalyst into an oxide (block 101). The pre-heating is done in order to promote outgassing of the carbonate catalyst before the brazing operation. At high temperature, carbonate is stable only under high pressure. Without such pressure, the thermally stable form is an oxide. Thus, by heating the carbonate PCD prior to brazing, at least a portion of the carbonate decomposes into an oxide. In one embodiment, the carbonate catalyst is a calcium carbonate, and the decomposition reaction proceeds as follows: $CaCO_3 \rightarrow CaO+CO_2$. In another embodiment, the carbonate catalyst is a magnesium carbonate ($MgCo_3$), which converts to magnesium oxide (MgO) and carbon dioxide ($CO_2$) during the decomposition reaction. The carbon dioxide is released as a gas, and the calcium oxide or magnesium oxide remains within the interstitial spaces of the PCD body. This is a decomposition reaction of the carbonate catalyst.

In one embodiment, pre-heating includes heating the carbonate PCD body to about 900° C. or higher for about one hour. In another embodiment, pre-heating includes heating to a temperature less than 1450° C., in a further embodiment to a temperature in the range of 900° C. to 1350° C., and in a yet a further embodiment to a temperature not greater than 1250° C., and in a further embodiment to a temperature in the range of 1000° C. to 1150° C. The duration of heating may be adjusted depending on the size (such as the thickness) of the carbonate PCD body. The duration may also be adjusted depending on the temperature—for example, at 1200° C., the duration may be reduced, for example, to approximately 30 minutes. The duration should be long enough to convert a portion of the carbonate catalyst to an oxide per the decomposition reaction described above. The heating may take place in an argon or nitrogen environment. Optionally, the heating may take place in an vacuum furnace, with a vacuum applied to the carbonate PCD body, but this is not required. If a vacuum is applied, it may be on the order of about 100 millitorr. In one embodiment, the pre-heating is performed without any pressure applied to the PCD body.

In one embodiment, the carbonate PCD body is pre-heated before it is assembled with the substrate and the braze material. This enables the carbonate catalyst to outgas without contaminating those other components. After the heat has been applied for the appropriate duration, the carbonate PCD body is cooled.

As a result of the pre-heating, a portion of the carbonate catalyst is converted into an oxide remaining within the interstitial spaces of the diamond body, and a portion of the carbonate is released and exhausted from the carbonate PCD body as carbon dioxide gas. In one example embodiment, after the carbonate material has been subjected to thermal treatment to convert the magnesium carbonate to magnesium oxide, it may be subsequently coated with a carbide-forming element such as titanium, tungsten, silicon, or chromium to improve the wettability with non-active brazes. The coating can also provide a barrier to prevent further gaseous decomposition of the carbonate binder from affecting brazing processes. The coating in one embodiment is deposited using a chemical vapor deposition (CVD) process. In one embodiment, the coating is 0.1 to 10 microns thick." In another embodiment the thermal treatment to convert the magnesium carbonate to magnesium oxide may be accomplished by heating using a torch prior to brazing to a substrate. In another embodiment, the carbonate PCD is heated (or preheated) by being exposed to heat during brazing which is often supplied by a torch. With these embodiments, the magnesium carbonate PCD is heated, prior to or during brazing, to a temperature not greater than 750° C. In one embodiment, the magnesium carbonate PCD is heated at a temperature in the range of 600° C. to 750° C. In another embodiment, the magnesium carbonate PCD is heated to a temperature in the range of 600° C. to 650° C. This heating causes some of the magnesium carbonate catalyst in the magnesium carbonate PCD body to convert to magnesium oxide (MgO) and carbon dioxide ($CO_2$) in localized regions near the carbonate PCD outer surfaces. In another embodiment, the magnesium carbonate PCD body is placed in a carbide powder. More specifically, carbide powder is placed in a refractory metal can, as for example a niobium can and the magnesium carbonated PCD body is placed in the can. In an embodiment, the carbide powder completely encapsulates (i.e., it completely surrounds) the magnesium carbonate PCD body. The magnesium carbonate PCD body surrounded by the carbide powder is then heated for heating the magnesium carbonate PCD body to a temperature in the range of about 400° C. to about 1250° C. In one embodiment the temperature is not greater than 650° C. In another embodiment, the temperature is in the range of 600° C. to 650° C. In one embodiment, the magnesium carbonate PCD body surrounded by the carbide powder is heated to this temperature for about an hour. This heating causes the magnesium carbonate catalyst in the magnesium carbonate PCD body to convert to magnesium oxide (MgO) and carbon dioxide ($CO_2$). After heating, the carbide powder surrounding the magnesium carbonate PCD body may attach itself to the magnesium carbonate PCD body. The carbide powder may be easily scraped off the magnesium carbonate PCD body.

Applicant discovered that when the magnesium carbonate catalyst decomposes to MgO and $CO_2$, the volume of the diamond surface shrinks and consequently, stresses on the surface of PCS body are relieved and the wear resistance of the PCD body greatly improves. In many instances, the wear resistance of the heat treated magnesium carbonate PCD body was more than double compared to magnesium carbonate PCD which was not heat treated. Heat-treated calcium carbonate PCD should have improvement is its wear resistance.

Referring again to FIG. 4, after the pre-heating, the method includes assembling the diamond body and a substrate (block 102). The method also includes providing a braze material between the diamond body and the substrate (block 103). The braze material may be provided as a separate disc of braze material, which may be referred to as a braze disc. The carbonate PCD body, braze layer, and substrate are stacked together into the assembly 20 shown in FIG. 2 and described above. The assembly 20 is placed within a vacuum furnace so that a vacuum may be applied during the braze operation. In one embodiment, the braze material may be an active braze such as copper (such as copper ABA) or palladium, or a nonactive braze material. Other examples of "active" braze materials that may be used include, but not limited to, those having the following composition and liquidus temperature (LT) and solidus temperatures (ST), where the composition amounts are provided in the form of weight percentages:

81.25 Au, 18 Ni, 0.75 Ti, LT=960° C., ST=945° C.;
82 Au, 16 Ni, 0.75 Mo, 1.25 V LT=960° C., ST=940° C.;
20.5 Au, 66.5 Ni, 2.1 B, 5.5 Cr, 3.2 Si, 2.2 Fe, LT=971° C., ST941° C.;
56.55 Ni, 30.5 Pd, 2.45 B, 10.5 Cr, LT=977° C., ST=941° C.;
92.75 Cu, 3 Si, 2 Al, 2.25 Ti, LT=1,024° C., ST=969° C.;
82.3 Ni, 3.2 B, 7 Cr, 4.5 Si, 3 Fe, LT=1,024° C.; ST=969° C.; and
96.4 Au, 3 Ni, 0.6 Ti, LT=1,030° C., ST=1,003° C.

Examples of "nonactive" braze materials that may be used include, but not limited to, those having the following composition and liquid temperature (LT) and solid temperature (ST), where the composition amounts are provided in the form of weight percentages:

52.5 Cu, 9.5 Ni, 38 Mn, LT=925° C., ST=880° C.;
31 Au, 43.5 Cu, 9.75 Ni, 9.75 Pd, 16 Mn, LT=949° C., ST=927° C.;
54 Ag, 21 Cu, 25 Pd, LT=950° C., ST=900° C.;
67.5 Cu, 9 Ni, 23.5 Mn, LT=955° C., ST=925° C.;
58.5 Cu, 10 Co, 31.5 Mn, LT=999° C., ST=896° C.;
35 Au, 31.5 Cu, 14 Ni, 10 Pd, 9.5 Mn, LT=1,004° C., ST=971° C.;
25 Su, 37 Cu, 10 Ni, 15 Pd, 13 Mn, LT=1,013° C., ST=970° C.; and
35 Au, 62 Cu, 3 Ni, LT=1,030° C., ST=1,000° C.

The method also includes heating the braze material to melt it, to form a braze joint between the carbonate PCD body and the substrate (block 104). The assembly 20 is heated within a vacuum furnace to a temperature just above the melting temperature of the braze. For example, in one embodiment, the braze material is copper, which has a melting temperature of about 1030° C., and the assembly 20 is heated to about 1050° C. The heat is applied for a duration of about 30 minutes, to thoroughly melt the braze layer 24. A vacuum is applied during heating, to isolate the melted braze material from surrounding air.

The method also includes increasing a pressure on the braze material after melting the braze material (block 105). The pressure is indicated by the arrow A in FIG. 2. In one embodiment, the pressure applied is between 1 to 1,000 kPa, and it is applied for about 1-5 minutes. In another embodiment, the pressure applied is between 1 to 50 MPa.

In one embodiment, the pressure (as noted by arrow A) is applied as an increased pressure toward the end of the braze process, after the braze has been melted. That is, the pressure is increased after the heat and vacuum have been applied and the braze has been melted. The pressure is variable during the heating process, rather than being a constant, single pressure load during the braze process. The pressure is applied to the assembly 20 while the assembly is within the vacuum furnace, and while the braze material 24 is melted. In one embodiment, a compact press or pressure table is installed within the vacuum furnace to apply this additional pressure during the braze operation. As an example, a vacuum furnace with adequate uniaxial pressure capability is available commercially, such as model HP 20 from Thermal Technology LLC (Santa Rosa, Calif.).

The brazing process may also be performed using induction heating in an ambient or atmospheric pressure environment, in a protective atmosphere such as an inert gas (such as nitrogen or argon). Systems for induction brazing are available from Raydyne Corporation (Milwaukee, Wis.). Pressure can be applied to an induction brazing system in a similar manner to that described above.

This active pressure, applied after the braze has melted, is applied in order to burst any bubbles that have formed in the melted braze layer 24 due to the outgassing of the carbonate catalyst in the carbonate PCD body 22. The increased pressure forces these bubbles out from the melted braze layer so that the melted braze layer is uniformly melted and heated.

Referring again to FIG. 4, the method includes cooling the braze material after increasing the pressure (block 106). The pressure indicated by arrow A in FIG. 2 is maintained on the assembly 20 while the assembly is cooled past the melting temperature of the braze. This pressure prevents any new bubbles or voids from forming in the braze material while the braze material is still in its melted state. Once the assembly has been cooled past the melting temperature of the braze, the pressure may be released.

Figure 3:
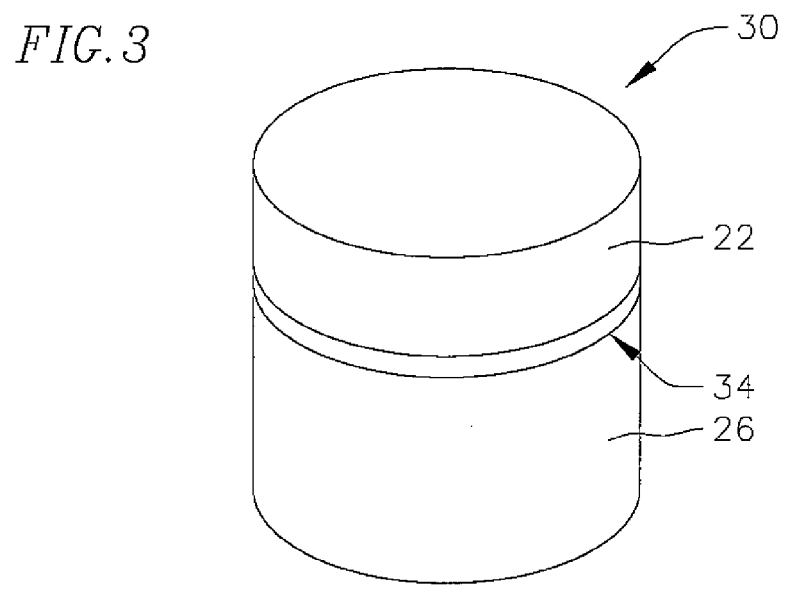
FIG. 3 illustrates a perspective view of a diamond compact incorporating a carbonate polycrystalline diamond body and a braze joint, according to an embodiment.

The result is a diamond compact including a carbonate PCD body attached to a substrate by a braze joint. A diamond compact 30 according to an embodiment is shown in FIG. 3. The diamond compact 30 includes a carbonate PCD body 22 and a substrate 26 bonded together by a braze joint 34. The carbonate PCD body 22 is expected to exhibit an increased presence of carbonate oxide, converted from the carbonate catalyst. The braze joint 34 is expected to exhibit a reduced presence of bubbles from the carbonate PCD, i.e., a reduced porosity, which leads to a reduced failure rate and increased yield strength. The diamond compact 30 is more thermally stable, and is able to operate at elevated temperatures without experiencing cracking or delamination caused from the presence of bubbles and voids in the braze joint. Also, by bursting the bubbles in the melted braze layer, the melted braze more uniformly wets the two facing surfaces of the diamond body and the substrate, leading to a stronger braze joint. Depending on pressure and/or time conditions, it is expected that the porosity of the braze layer can be reduced such that the braze layer is approximately 99.0 to 99.99 % dense.

In another embodiment, pre-heating may be combined with the braze process. In this embodiment, the carbonate PCD body, the braze material, and the substrate are combined into a stacked assembly and placed within a vacuum furnace (optionally within a can such as can 28). The assembly is then heated to a temperature below the melting point of the braze layer. At this temperature, the braze does not melt, but the heat promotes the decomposition of the carbonate catalyst. As a result, the carbonate PCD body outgasses before the braze has melted. After an appropriate duration of pre-heating, the heat is then increased past the melting temperature of the braze material, to melt the braze (see block 104 in FIG. 4), and the pressure is increased after the braze is melted, as described above.

In an embodiment, an active metal may be mixed with the braze material in the braze layer 24 (see FIG. 2). When the assembly 20 is heated, the carbonate PCD body may outgas. When the gas enters the melted braze, the carbon attaches to the metal to form a solid rather than a gas. This creates a solid precipitate in the braze, instead of a bubble. This can help reduce the presence of bubbles in the braze layer. In an embodiment, the active metal is sodium or potassium.

Figure 5:
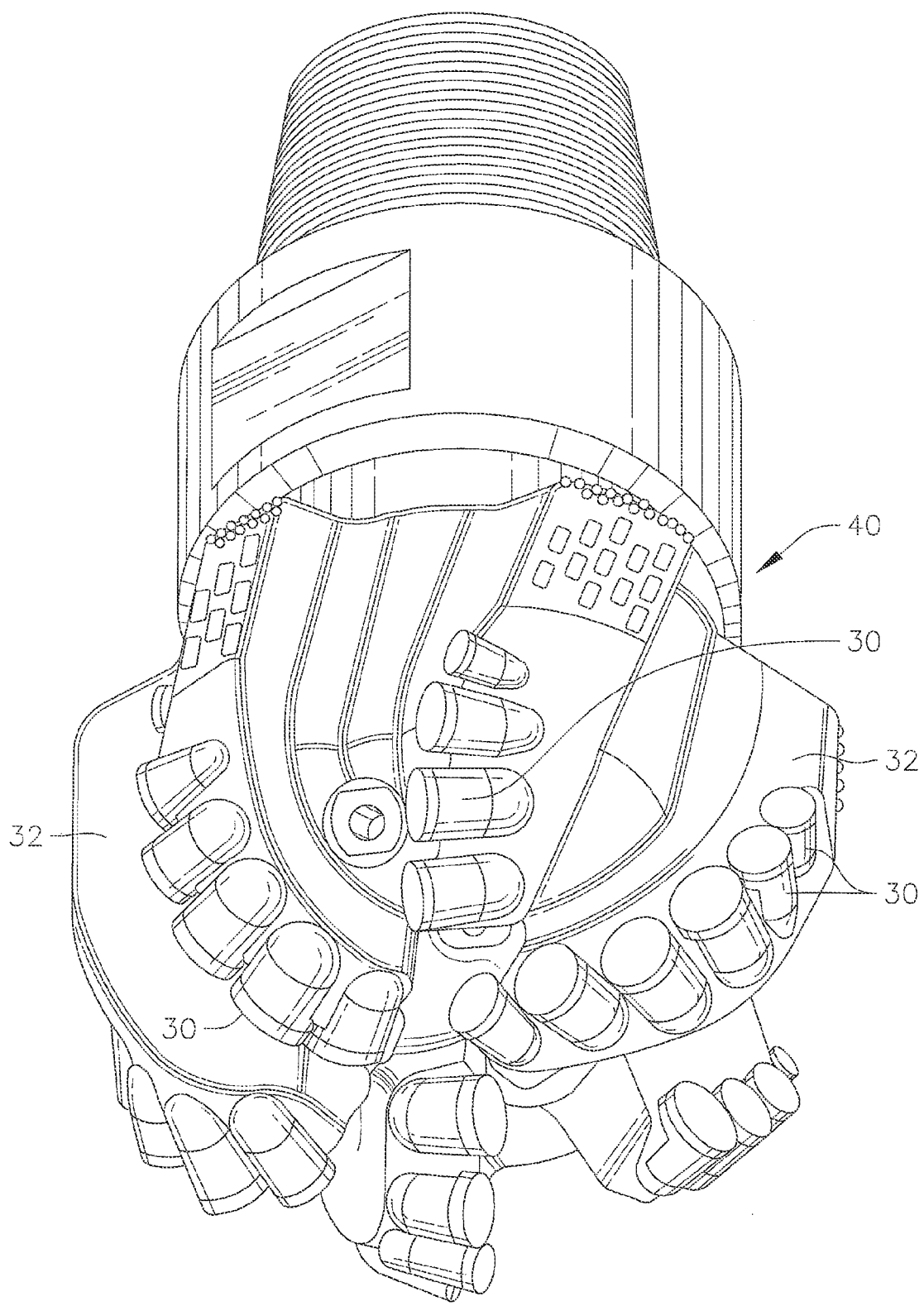
FIG. 5 illustrates a perspective view of a drag bit incorporating the cutting element of FIG. 3.

The diamond compact 30 shown in FIG. 3 is formed as a cutting element for incorporation into a cutting tool. FIG. 5 shows a drag bit 40 incorporating the cutting element of FIG. 3, according to an embodiment of the disclosure. The drag bit 40 may include several cutting elements 30 that are each attached to blades 32 that extend along the drag bit. The drag bit may be used for high-temperature rock drilling operations. In other embodiments, other types of drilling or cutting tools incorporate cutting elements that have a thermally stable diamond element forming at least a portion of the cutting edge of the cutting element, such as, for example, rotary or roller cone drilling bits, or percussion or hammer drill bits. In one embodiment, the cutting element is a shear cutter.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. It is the express intention of the application not to invoke 35 U.S.C. §112, paragraph 6 for any limitations of any of the claims herein, except for those in which the claim expressly uses the words 'means for' together with an associated function.

What is claimed is:

1. A method for making a diamond compact, comprising:
   pre-heating a polycrystalline diamond body comprising a carbonate catalyst to convert at least a portion of the carbonate catalyst into an oxide in a region comprising an outer surface of the polycrystalline diamond body, including a diamond body facing surface;
   coating said diamond body with a carbide-forming element after the pre-heating;
   assembling the polycrystalline diamond body and a substrate;
   providing a braze material between the diamond body facing surface of the polycrystalline diamond body and a substrate facing surface of the substrate;
   heating the braze material, after pre-heating and coating, to melt the braze material;
   applying a pressure to the braze material; and
   cooling the braze material after applying the pressure.

2. The method of claim 1, further comprising applying the pressure on the braze material after melting the braze material.

3. The method of claim 2, wherein the oxide forms bubbles in the melted braze material, and wherein applying the pressure to the braze material comprises applying the pressure at a level for eliminating at least a portion of the bubbles in the braze material.

4. The method of claim 2, wherein heating the braze material to melt the braze material comprises heating for a duration, and wherein the pressure is applied for only a portion of the duration.

5. The method of claim 2, further comprising varying the pressure applied to the braze material during the heating of the braze material.

6. The method of claim 2, further comprising maintaining the pressure while cooling through the melting point of the braze material.

7. The method of claim 2, wherein the pressure is applied within a vacuum furnace.

8. The method of claim 1, wherein pre-heating comprises heating to about 900° C.

9. The method of claim 1 wherein the carbonate catalyst comprises magnesium carbonate, and wherein pre-heating comprises pre-heating the polycrystalline diamond body to a temperature not greater than 1450° C., and wherein the oxide comprises magnesium oxide.

10. The method of claim 1 wherein the carbonate catalyst comprises magnesium carbonate, and wherein pre-heating comprises surrounding the polycrystalline diamond body with a carbide powder and exposing said diamond body to a temperature not greater than 650° C., and wherein the oxide comprises magnesium oxide.

11. A bit for drilling subterranean formations comprising a bit body and a plurality of cutting elements operatively attached to the bit body, wherein at least one of the cutting elements comprise the diamond compact made according to the method of claim 1.

12. A method for making a diamond compact, comprising:
   assembling a polycrystalline diamond body and a substrate, wherein the polycrystalline diamond body comprises a carbonate catalyst;
   coating said polycrystalline diamond body with a carbide-forming element;
   providing a braze material between the polycrystalline diamond body and the substrate;
   heating the braze material to melt the braze material;
   applying a pressure to the braze material; and
   cooling the braze material after applying the pressure.

13. The method of claim 12, further comprising applying the pressure to the braze material after melting the braze material.

14. The method of claim 12, wherein the diamond body further comprises a metal oxide.

15. The method of claim 14, wherein the diamond body comprises a magnesium carbonate catalyst, and wherein the metal oxide comprises magnesium oxide.

16. The method of claim 12, wherein coating said polycrystalline diamond body with a carbide-forming element comprises coating said polycrystalline diamond body with a carbide-forming element prior to heating.

17. The method of claim 1, wherein assembling the polycrystalline diamond body and the substrate occurs after pre-heating the polycrystalline diamond body.

18. The method of claim 12, wherein heating the braze material to melt the braze material comprises heating for a duration, and wherein the pressure is applied for only a portion of the duration.

19. The method of claim 12, further comprising varying the pressure applied to the braze material during the heating of the braze material.

20. A method for making a diamond compact, comprising:
   pre-heating a polycrystalline diamond body comprising a magnesium carbonate catalyst to convert at least a portion of the magnesium carbonate catalyst into magnesium oxide in a region comprising an outer surface of the polycrystalline diamond body, including a diamond body facing surface by:
      surrounding the polycrystalline diamond body with a carbide powder; and
      exposing said diamond body to a temperature not greater than 650° C.;
   assembling the polycrystalline diamond body and a substrate;
   providing a braze material between the diamond body facing surface of the polycrystalline diamond body and a substrate facing surface of the substrate;
   heating the braze material, after pre-heating, to melt the braze material;
   applying a pressure to the braze material; and
   cooling the braze material after applying the pressure.

* * * * *